Aug. 11, 1959 J. P. MORRELL 2,899,093
HYDRAULIC LIFT TRUCKS
Filed April 25, 1955 7 Sheets-Sheet 2

INVENTOR.
JOHN P. MORRELL
BY
Harry H. Hitzeman
ATTORNEY.

Aug. 11, 1959 J. P. MORRELL 2,899,093
HYDRAULIC LIFT TRUCKS
Filed April 25, 1955 7 Sheets-Sheet 3
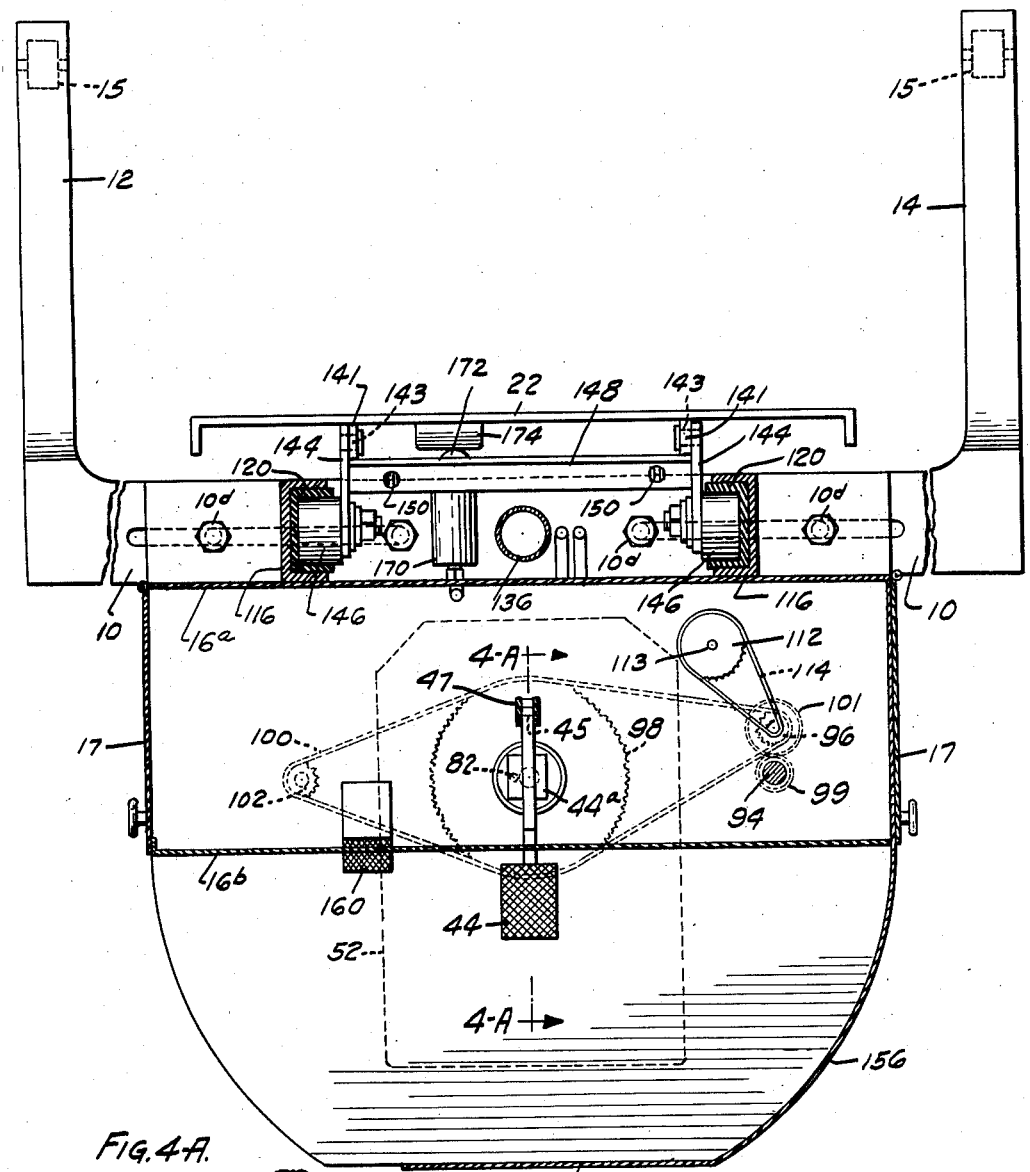
FIG. 4.
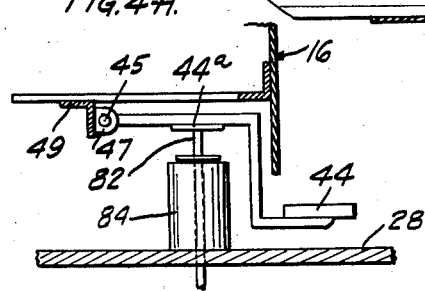
FIG. 4-A.
INVENTOR.
JOHN P. MORRELL
BY
Harry H. Hitzeman
ATTORNEY.

Aug. 11, 1959 J. P. MORRELL 2,899,093
HYDRAULIC LIFT TRUCKS
Filed April 25, 1955 7 Sheets-Sheet 4
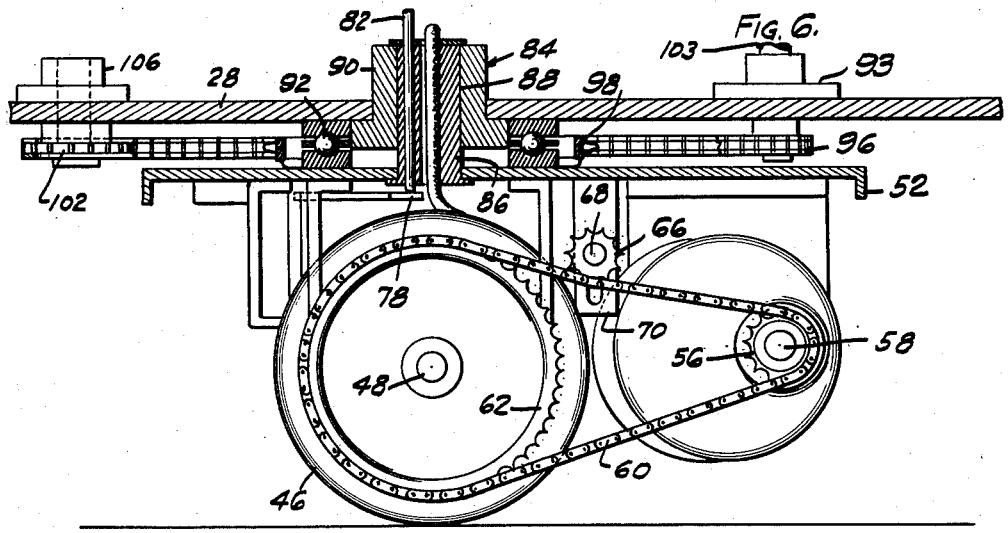
FIG. 6.
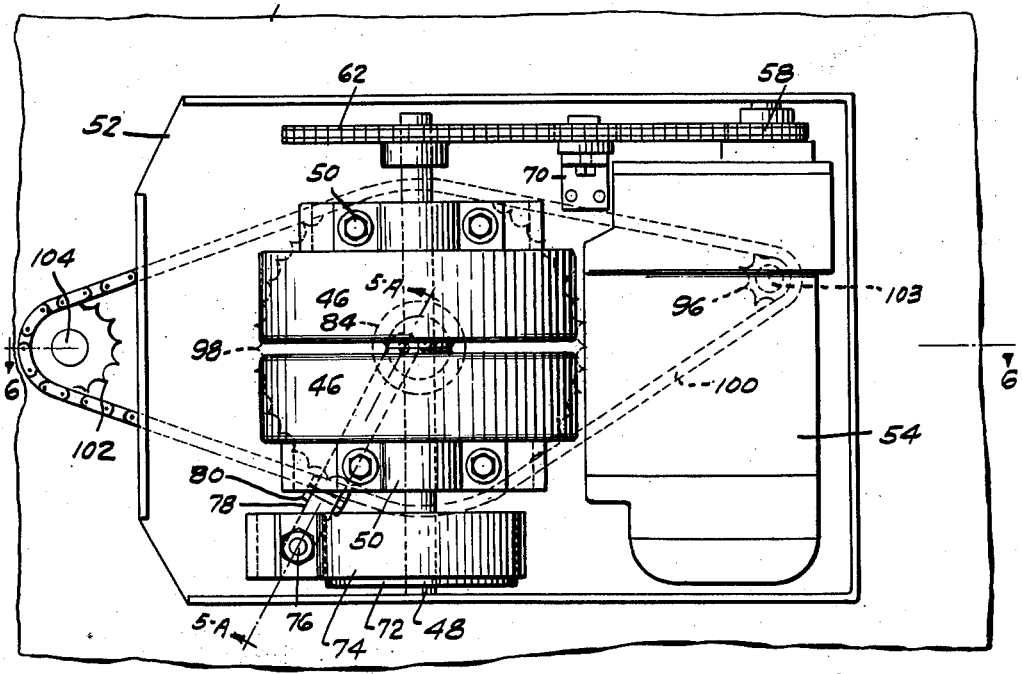
FIG. 5.
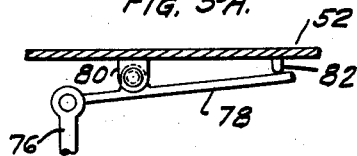
FIG. 5-A.
INVENTOR
JOHN P. MORRELL
BY
Harry H. Hitzman
ATTORNEY.

Aug. 11, 1959

J. P. MORRELL 2,899,093

HYDRAULIC LIFT TRUCKS

Filed April 25, 1955

INVENTOR
JOHN P. MORRELL
By Harry H. Hitzeman
ATTORNEY.

Aug. 11, 1959   J. P. MORRELL   2,899,093
HYDRAULIC LIFT TRUCKS
Filed April 25, 1955   7 Sheets-Sheet 6

INVENTOR
JOHN P. MORRELL
By Harry H. Hiteman
ATTORNEY.

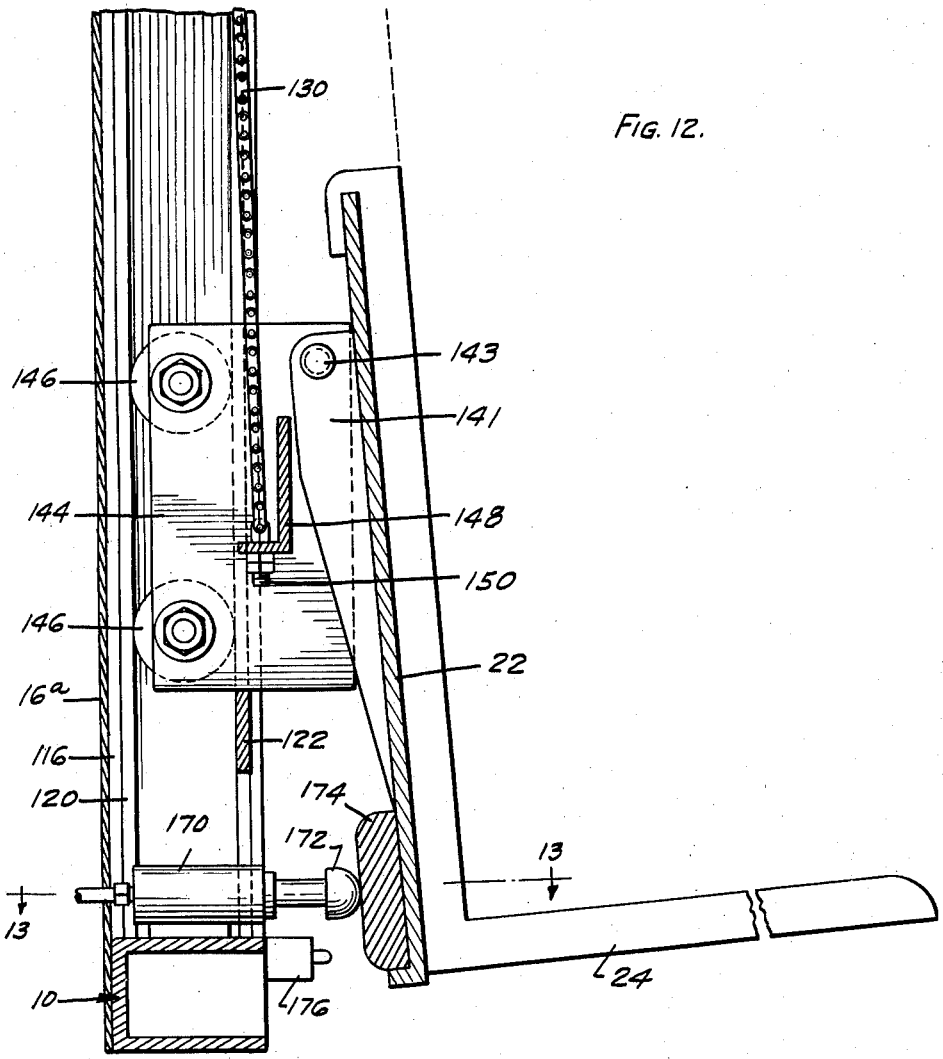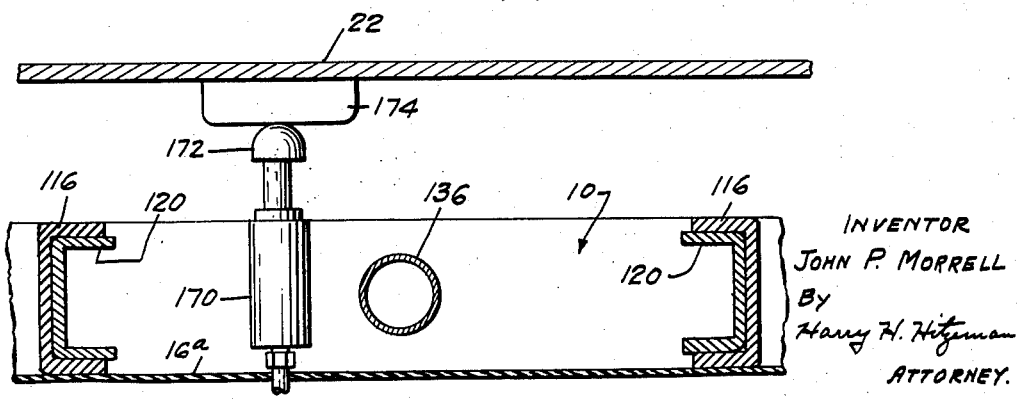

United States Patent Office 2,899,093
Patented Aug. 11, 1959

2,899,093

HYDRAULIC LIFT TRUCKS

John P. Morrell, Wheaton, Ill.

Application April 25, 1955, Serial No. 503,413

2 Claims. (Cl. 214—700)

My invention relates to improvements in hydraulic lift trucks and similar devices.

My invention relates more particularly to improvements in trucks of this general type that are used in factories, warehouses, etc. and at loading and unloading platforms in truck or railway centers to pick up goods placed on skids or pallets and transport them from one point to another and deposit them in a desired location and at a desired height or level with no manual handling of the same.

One of the principal objects of the present invention is to provide a power driven material handling lift truck of the type described that is comparatively light in weight for its capacity, so that it may be employed upon any of the floors of a building without concern over the safe floor weight of the upper floors. In addition, the present design has been produced to restrict to a minimum the overall size so that the truck may be employed in narrow corridors and small spaces. To this end the same has been made quite compact, yet with sufficient space for the operator to be able to stand on the same and efficiently maneuver it with ease.

A further object of the invention is to provide an operator's platform directly behind the mast, and lifting mechanism with the steering wheel to his right for normal right hand operation with a control panel having the controls for raising and lowering the lifting forks, and the controls for forward and reverse movement available and conveniently placed for left hand operation. In addition, the brake pedal and "dead man control" pedal are positioned and arranged for normal operation by the left foot of the operator.

A further object of the invention is to provide in a convenient location directly in front of the operator, a direction indicator for constantly showing the operator the direction the truck will move if the starting pedal is depressed. As the steering wheel is turned, the directional indicator will move to continuously show the direction being traveled.

A further object of the invention is to provide in a truck of the type described, a novel construction for outrigger attachment so that narrower or wider outriggers may be used, depending on the width of the aisles that must be traveled and the width of the goods to be handled.

A further object of the invention is to provide an improved hydraulic lift truck of the type described in which the driving and steering mechanism are combined to effect a tricycle wheeled support for easy and quick maneuverability of the same and capability of turning in a minimum of space.

A further object of the invention is to provide an improved hydraulic lift truck of the type described in which the wheeled support is triangular, the support wheels being located centrally of the operator's platform and at the ends of the outriggers to distribute the weight over the greatest possible area.

A further object of the invention is to provide a comparatively simple mounting plate and king-pin construction in association with the driver's platform so arranged that the driving and steering wheel of the truck can be swung about in an arc of approximately 180 degrees.

A further object of the invention is to provide an improved construction of elevator and face plate therefor wherein the lifting forks may be introduced below a pallet or skid loaded with materials to be moved, and means to tilt the face plate, lifting forks and load at a slight backward angle for movement to its destination without danger of any of the load falling off en route. This construction may include the use of a pivotally hung face plate and a hydraulic ram mounted upon the base of the truck for moving the lower end of the face plate outwardly about its pivot. The control for this mechanism will include a micro-switch for actuating the pump motor only when the face plate and lifting plates are close to the floor and a control lever mounted on the control panel.

A further object of the invention is to provide an improved lift truck of the type described operated by storage batteries, which includes a housing for the same and the hydraulic pump mechanism directly behind the mast of the truck, the interior of the same being easily accessible through doors on both sides of the same. The top of this housing serves as a flat instrument board and control panel so that all the operator's controls will be in plain view and easy reach before him.

All these and other objects and advantages will be more apparent from the following description wherein reference is had to the accompanying drawings, upon which:

Fig. 4 is a plan sectional view of the lift truck taken generally on the lines 4—4 of Fig. 2;

Figure 9:
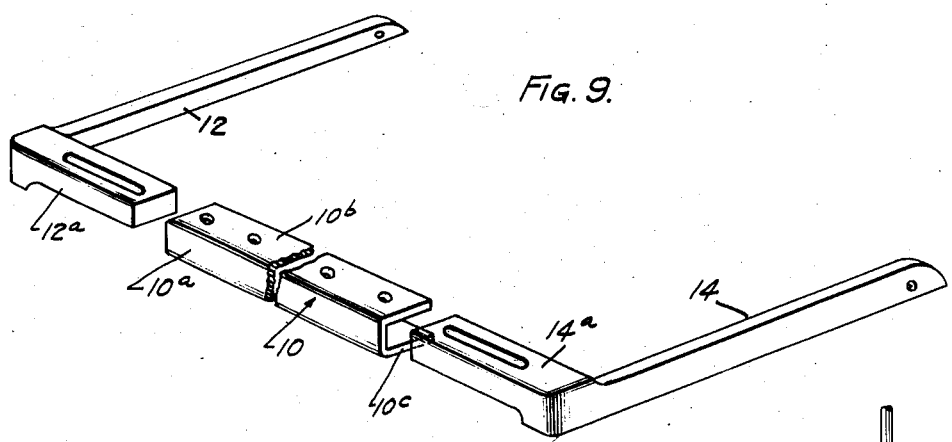
Figure 7:
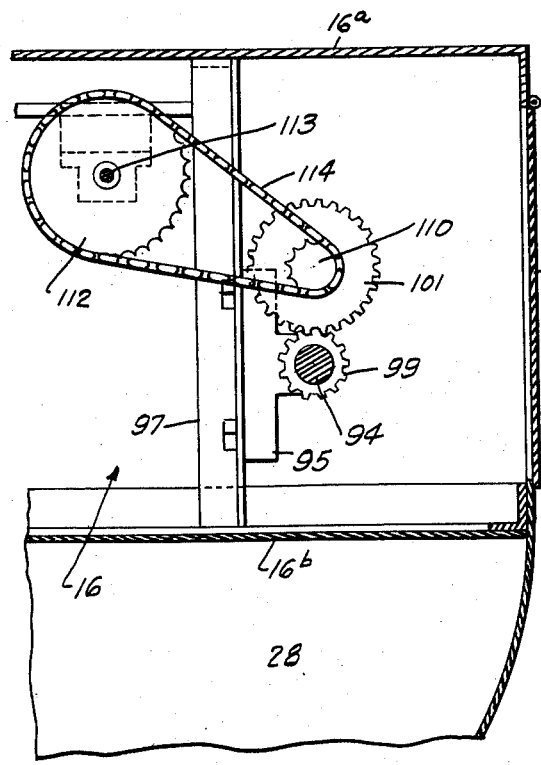
Figure 8:
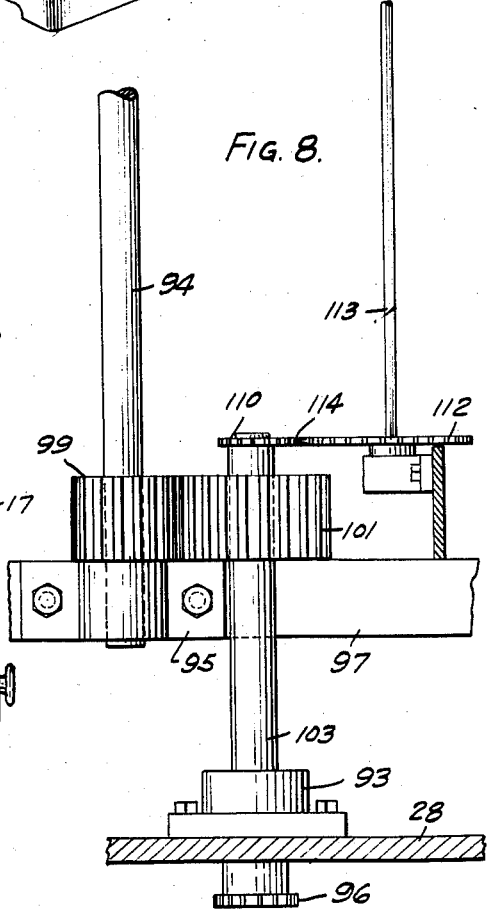
Figure 10:
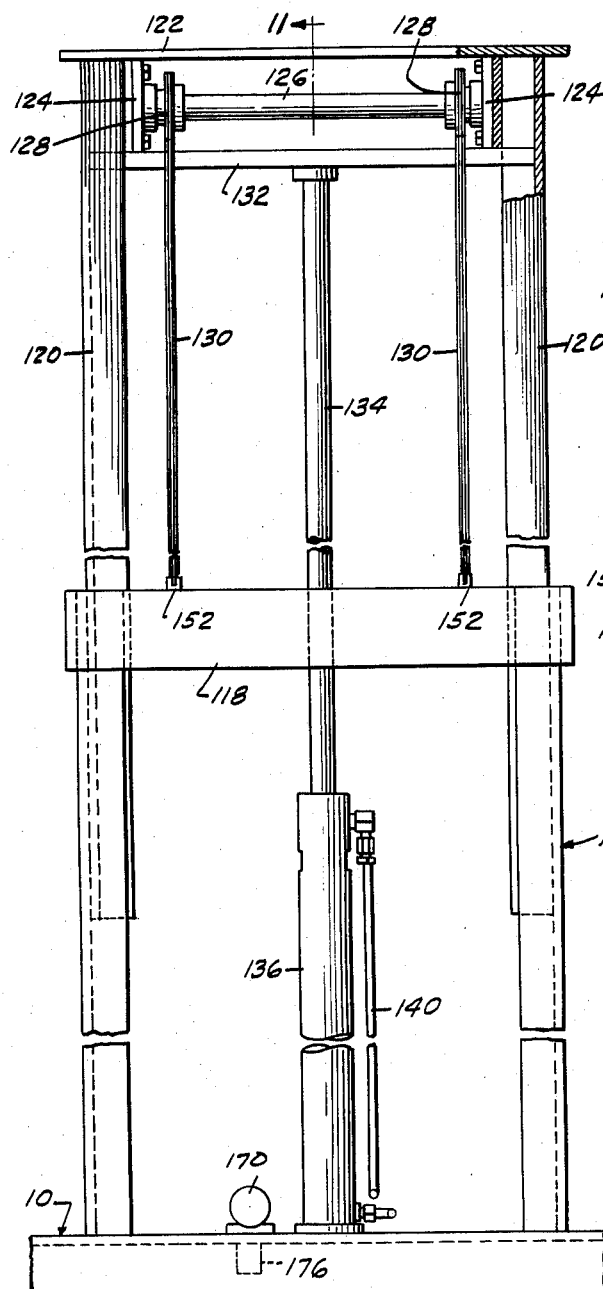
Figure 11:
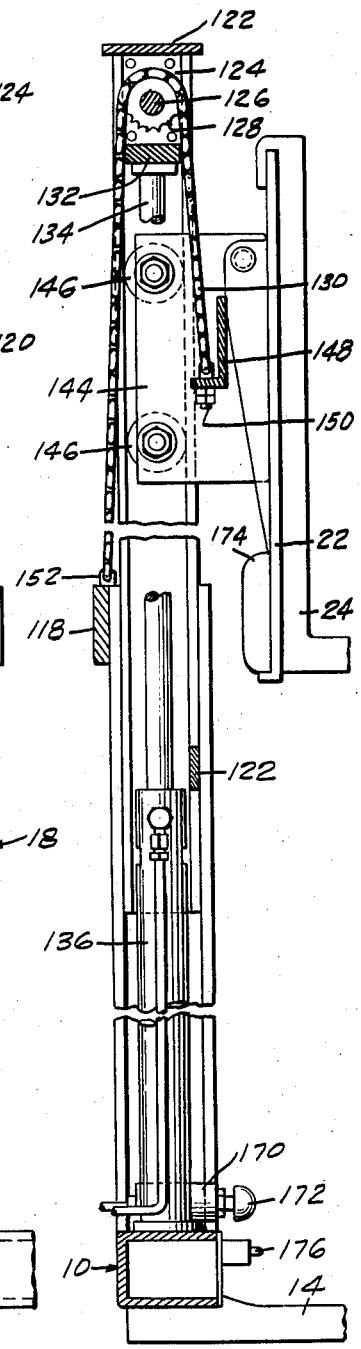

Fig. 4-A is a fragmentary cross-sectional view on the line 4A—4A of Fig. 4 showing the brake pedal mechanism;

Fig. 5 is a bottom plan view of the turntable, drive and steering wheel and associated mechanism looking up against the bottom of the floor of the cab;

Fig. 5-A is a fragmentary sectional view showing the brake operating lever and a portion of the turntable, and is taken generally on the line 5A—5A of Fig. 5;

Fig. 6 is a cross-sectional view through the king pin, turntable and motor support mechanism taken generally on the line 6—6 of Fig. 5;

Fig. 7 is a fragmentary plan sectional view through the storage battery cabinet and associated parts to show generally the steering wheel shaft and drive to the direction indicator needle;

Fig. 8 is a fragmentary vertical sectional view through the steering wheel shaft and associated parts showing the drive for the indicator needle;

Fig. 9 is an exploded perspective view of the outriggers and horizontal support therefor, showing the manner in which the width between the outriggers may be varied;

Fig. 10 is a fragmentary vertical sectional view looking forward against the horizontal support base, mast and lifting mechanism, the view being taken on the line 10—10 of Fig. 4 and the parts being broken to foreshorten the same;

Fig. 11 is a vertical sectional view thereof taken generally on the line 11—11 of Fig. 10;

Fig. 12 is a vertical fragmentary sectional view showing the face plate and lifting forks in a tilted position; and Fig. 13 is a plan view of the same taken on the line 13—13 of Fig. 12.

In the embodiment of the invention which I have chosen to illustrate and describe the same, the main features of the construction may include the horizontally disposed U-shaped channel 10 which may be generally the base of the truck, a pair of outriggers 12 and 14 which extend forward from the same, a housing 16 for the storage batteries and control mechanism disposed behind the base 10, and a mast 18 mounted upon the base 10 right in front of the cabinet 16. An elevator 20 equipped with a face plate 22 and lifting forks 24 is mounted for vertical movement within the mast 18 in a manner which will be more clearly described hereinafter.

Figure 1:
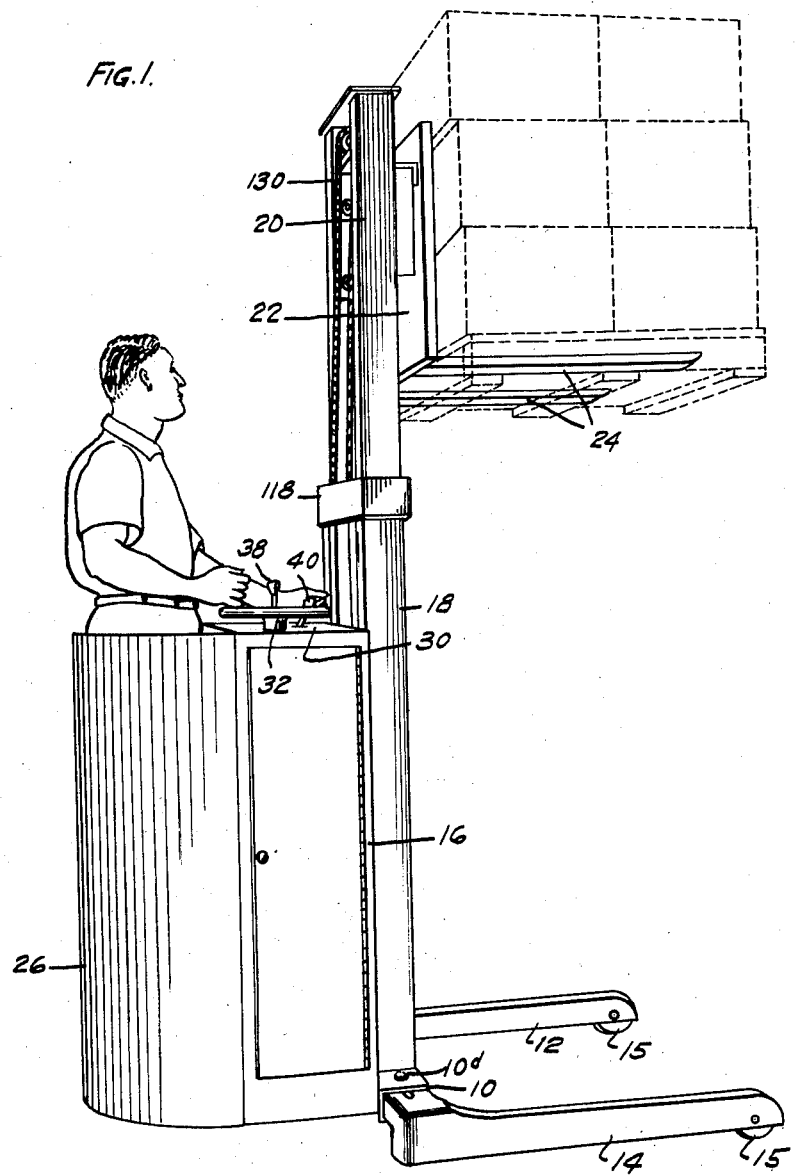
Fig. 1 is a side view generally in perspective of my improved lift truck with the mast and lifting mechanism in raised position to unload materials at a comparatively high level, the view also showing an operator standing in position in the cab controlling the steering of the truck with his right hand, and the raising and lowering mechanism with his left hand.
Figure 2:
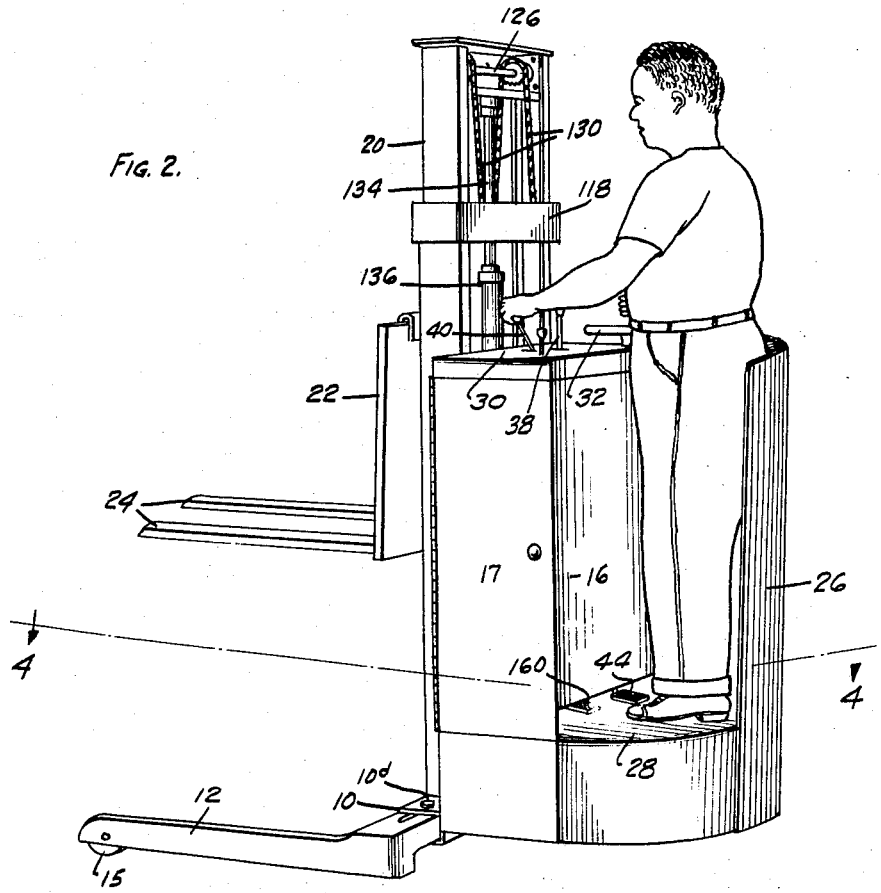
Fig. 2 is a side view generally in perspective from the opposite side of the lift truck showing the operator standing in the cab and showing the location of the brake adjacent the operator's left foot.
Figure 3:
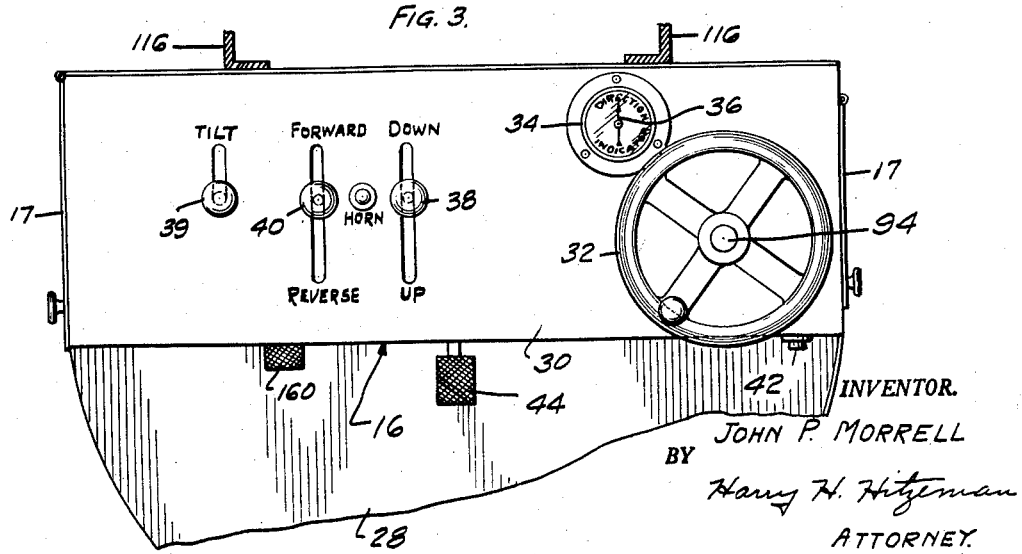
Fig. 3 is a fragmentary plan view of the top of the control panel showing the position of the direction indicator with respect to the other controls mounted thereon.

The housing 16 may form part of the operator's cab 26 which may include a floor 28 upon which the operator may stand, with a control panel 30 horizontally disposed on the top of the cabinet 16. The control panel, as best seen in Fig. 3, may have a steering wheel 32 mounted adjacent the right edge of the same with a direction indicator 34 disposed thereon in front of the steering wheel 32, the direction indicator having a needle 36 which will always point in the direction that the truck will move when power is applied.

A control lever 38 is mounted for easy manipulation with the left hand of the operator on the control panel 30 adjacent a similar control lever 40 with indicia upon the panel to show the operation of these levers. For example, when the lever 38 which controls the elevator is moved forward the elevator will move down, and when it is moved back the elevator will move up. In a similar manner, when the control lever 40 is moved forward the truck will move forward, and when it is moved back the truck will move backwards. A motor control switch button 42 is also mounted on the side of the housing 16 adjacent the top thereof within easy reach of either the right or left hand of the operator. A control lever 39 is also provided on the panel, this lever operable to control a hydraulic ram for tilting the face plate and lifting forks, as will be hereinafter explained.

In addition, the brake control lever 44 is mounted medially of the cab so that the entire control simulates generally that used in driving an automobile, thus making it a simple matter to teach the average individual to operate the lift truck mechanism.

The drive for the lift truck may include a pair of driving wheels 46 which are mounted below the floor 28 on a shaft 48 that is journaled in suitable bearings 50 fastened to the bottom of a turntable 52. A driving motor and gear reducer unit 54 is also fastened to the bottom of the turntable 52 adjacent the drive wheels 46 and power is transmitted from the motor 54 through the gear reducer to a sprocket 56 mounted on a drive shaft 58. The sprocket 56 drives a chain 60 that meshes with a larger sprocket 62 that is keyed to the shaft 48, the chain also engaging an idler sprocket 66 mounted on a shaft 68. The shaft 68 is mounted in a bracket 70 which is also fastened to the bottom of the turntable 52, the shaft being adjustable in the bracket so that any slack in the chain can readily be taken up when desired.

A brake unit comprising a rotor 72 and an encircling brake band 74 is associated with the shaft 48. A brake rod 76 extends upwardly from the brake drum 74 for movement from the brake pedal 44. This is accomplished by means of a lever 78 that is connected to the end of the rod 76, the lever being pivoted in suitable brackets 80 on the bottom of the turntable 54. The lever 80 extends forward to the king pin mounting of the turntable and underlies a rod 82 which is depressed by operation of the brake lever 44 to pull on the rod 76 and tighten the brake drum 74 on the brake ring 72. The brake lever 44 carries a plate 44a overlying the end of rod 82 and is pivoted at 45 on a bracket 47 carried by an angle member 49 of one of the battery shelves in the cabinet or housing 16.

The king pin 84, which supports the turntable for rotary movement, may include an upwardly extending post 86 which is mounted in a cylindrical bore 88 in a support post 90 that is fastened to the floor 28 of the cab. A thrust bearing 92 is disposed between the top of the turntable 82 and the bottom of the floor 28 of the cab. Thus, the turntable and king pin are free to turn carrying the rod 82 with them, but the rod will always bear against the bottom of the plate 44a on the brake lever 44.

A steering rod 94 may extend downwardly from the steering wheel 32 to a bearing 95 that is mounted on a cross-brace 97 in the control cabinet of the truck. A gear 99 is keyed to the shaft 94 and meshes with a 2-to-1 ratio gear 101 that is fastened adjacent the upper end of a vertical shaft 103 which extends through the floor 28 and carries a sprocket wheel 96 at its lower end. The shaft 103 is mounted in a suitable bearing 93 on the floor of the cab.

The sprocket wheel 96 may mesh with a chain 100 which also meshes with a sprocket wheel 98 that is fastened on top of the turntable 52, the chain 100 also being disposed about an idler sprocket 102 that is mounted on a stub shaft 104 carried by a bearing 106 positioned on the floor 28 of the cab.

The shaft 103 which carries the gear 102 meshing with the gear 99 on the steering rod 94, also carries a small sprocket 110 at its upper end, the sprocket 110 driving a larger sprocket wheel 112 by means of a chain 114. The sprocket wheel 112 is connected to the lower end of a vertical shaft 114 which extends upwardly through the instrument panel and carries the indicating needle 36 at its upper end. With this arrangement the turntable is rotated to turn the driving wheels in the direction in which the lift truck is to travel, and through the sprockets and chain drive for the indicator needle, the direction of travel will be at all times visible to the operator. In this way, prior to starting the movement of the truck the operator can tell at a glance in which direction it will go when power is applied, thus eliminating accidents such as would happen where the direction in which the driving wheels are turned is unknown to the operator. This will avoid needless accidents and save injury to other workmen who may be in the vicinity of the lift truck when it is started.

As previously stated, the base 10 of the unit may be a U-shaped channel member which has the back wall 10a, top wall 10b, and bottom wall 10c. The outriggers 12 and 14 which may be right and left handed, are provided with transversely extending portions 12a and 14a which are telescopically received in the two ends of the base 10 and fastened thereto by a plurality of bolt members 10d that pass through elongated slots in the extensions 12a and 14a of the outriggers. Where the material to be handled or the other conditions require wider outriggers, the bolts 10d may be loosened and the outriggers 12 and 14 moved outwardly in the slots and then fastened.

The mast 18 which comprises a pair of facing U-shaped channels 116 is mounted on the base 10, the U-shaped channels being welded or otherwise secured thereto at their lower ends. The upper ends of the channel members may be connected by a suitable cross-brace 118.

The elevator 20 may generally comprise a pair of U-shaped channel members 120 of a size so that they may slide up and down in the channel members 116, the channel members 120 being connected by cross plates 122 at their upper and lower ends. A pair of bearings 124 are fastened to the upper ends of the channels 120 to support a shaft 126 between the ends of the same. The shaft 126 carries a pair of sprockets 128 adjacent the two channel members, a pair of chains 130 being trained over the sprockets 128. A cross-brace 132 is welded or otherwise secured between the channels 120 below the sprockets 128, the brace 132 having the piston rod 134 connected thereto at its upper end. The piston rod 134 is mounted in the hydraulic cylinder 136 and a conduit 138 leads from a suitable pump mechanism in the control cabinet to provide hydraulic pressure for raising the rod 134 and elevator 20 when desired. A bleeder conduit 140 may extend to the hydraulic cylinder operating mechanism from the top of the cylinder 136 for by-passing the fluid when the elevator has reached its top limit position.

The face plate 22 which carries the lifting forks 24 may have a pair of ribs 141 fastened to the back of the same. Each of the ribs carries a pin 143 to pivotally support a plate member 144. Each of the plate members 144 carries a pair of rollers 146 that are confined within the side walls of the channel members 120. A horizontally disposed angle member 148 may be fastened between the plates 144 and have bolts 150 secured thereto for connecting to one end of each of the chains 130. The other ends of the chains may be fastened to suitable hanger bolts 152 on the cross-brace 118 of the mast 18.

With this construction, when hydraulic pressure is applied, the face plate 22 and elevator 20 will automatically raise or lower under the control of the hand lever 38. Each of the outriggers 12 and 14 are provided with one or more rollers 15 adjacent their outer ends so that at all times the weight of the truck and its cargo is evenly distributed over the triangular support of the rollers 15 and the drive wheels 46.

When the face plate and lifting forks are lowered to the floor and moved to a position to lift a load, it is sometimes desirable to tilt the load backward slightly so that it can be more easily transported without possibility of any of the load falling off. In order to tilt the face plate and lift forks for this purpose, I have provided a horizontally disposed hydraulic ram 170 which may be mounted on the top of the base 10, the hydraulic ram carrying a plunger 172. I provide a block 174 on the back of the face plate 22 adjacent the lower end thereof, the block being so positioned that when the face plate is in its lowermost position it is in front of the plunger 172. I also provide a micro-switch 176 which is tripped by the block 174 so that the tilt control lever 39 will only energize the hydraulic ram 170 when the micro-switch is engaged by the block 174.

Thus, by use of the hydraulic ram 170, the face plate 22 can be tilted about its pivots 143 only at the lowermost position of the same. When the load has been transported in a tilted position to its destination, the elevator may be operated and as the load starts upwardly the face plate will settle against the edges of the support plates 144 in a straight vertical position. Thus it can be seen that the operator is at all times in a position where complete control of the operation of the truck is assured, his position being directly back of the instrument panel and storage battery housing, with the steering wheel at all times in the control of his right hand, leaving his left hand to operate the elevator lever or the forward or reverse lever as desired.

In addition, a vertical shield or panel 156 may be provided about one side and a portion of the back of the cab so that the operator is protected and may be supported against the back panel 158 of the shield. As in all lift trucks of the type described, a "dead man control" 160 is also provided adjacent the brake pedal 44 so that whenever the operator leaves the cab the movement of the truck automatically ceases.

The housing 16 for the hydraulic pump and other mechanism is sufficiently spacious for the reception of the storage batteries necessary in a truck of this type, the housing having the front wall 16a adjacent the mast 18, a back wall 16b and side doors 17 on each side of the same for easy access to any of the parts within the housing.

From the above and foregoing description it can be seen that I have provided a highly improved lift truck of the type described wherein for the first time the controls are all located so that the average person who understands and can drive an automobile is capable of operating the truck in the same manner as driving an automobile. In addition, with the direction indicator on the control panel, he is apprised at all times of the directional move when power is applied to the drive wheel.

The provision of the base, mast and outriggers as above described provides for easy and quick assembly and permits the use of outriggers of various widths in a standard construction when the requirements for the same are found. In addition, the simplicity of the elevator, the mast and the location and construction of the hydraulic lift and associated parts are such that the same will withstand long and hard usage without becoming broken or out of order.

I contemplate that changes and modifications may be made in the exact details shown and I do not wish to limit myself in any particular; rather what I desire to secure and protect by Letters Patent of the United States is:

1. A lift truck having a horizontally disposed U-shaped base frame, a horizontally disposed hydraulic plunger mounted on said base frame, a mast consisting of a pair of vertically disposed U-shaped channels positioned thereon in facing relation, a cross-brace connecting the upper ends of said channel members, an elevator positioned therein, said elevator comprising a pair of U-shaped channel members of a size that may reciprocate in the first mentioned channel members, a cross-brace connected between the upper ends of said second channel members, a cross-shaft supported by said cross-brace, a pair of sprockets on said shaft, a pair of chains trained about said sprockets, a hydraulic jack mounted on said base for raising and lowering said elevator, a face plate, said chains fastened at one end to said mast and at the other end to said face plate, a pair of angle members pivotally connected to the back of said face plate and rollers on said angle members for guiding said face plate between the legs of said second mentioned channel members, said face plate having a block on the back of the same adjacent the lower end thereof mounted in front of said hydraulic plunger.

2. A lift truck having a horizontally disposed U-shaped base frame, a horizontally disposed hydraulic plunger mounted on said base frame, a mast consisting of a pair of vertically disposed U-shaped channels positioned thereon in facing relation, a cross-brace connecting the upper ends of said channels members, an elevator positioned therein, said elevator comprising a pair of U-shaped channel members of a size that may reciprocate in the first mentioned channel members, a cross-brace connected between the upper ends of said second channel members, a cross-shaft supported by said cross-brace, a pair of sprockets on said shaft, a pair of chains trained about said sprockets, a hydraulic jack mounted on said base for raising and lowering said elevator, a face plate, said chains fastened at one end to said mast and at the other end to said face plate, a pair of angle members pivotally connected to the back of said face plate and rollers on said angle members for guiding said face plate between the legs of said second mentioned channel members, said face plate having a block on the back of the same adjacent the lower end thereof mounted in front of said hydraulic plunger, means for operating said hydraulic plunger and switch means for rendering said means operative only when said face plate is in lowered position.

References Cited in the file of this patent

UNITED STATES PATENTS

| | | |
|---|---|---|
| 1,001,837 | Fuller | Aug. 29, 1911 |
| 1,681,867 | McGannon | Aug. 21, 1928 |
| 2,312,942 | Ulinski | Mar. 2, 1943 |
| 2,320,600 | Howell | June 1, 1943 |
| 2,421,472 | Way | June 3, 1947 |
| 2,564,002 | Gibson | Aug. 14, 1951 |
| 2,641,336 | Chanda | June 9, 1953 |
| 2,645,306 | Turner | July 14, 1953 |
| 2,678,746 | Gibson | May 18, 1954 |
| 2,706,120 | Stratton | Apr. 12, 1955 |
| 2,713,918 | Framhein | July 26, 1955 |
| 2,739,783 | Pentecost | Mar. 27, 1956 |